(12) United States Patent
Kikuchi et al.

(10) Patent No.: US 8,405,272 B2
(45) Date of Patent: Mar. 26, 2013

(54) SELF-STARTING PERMANENT MAGNET SYNCHRONOUS MOTOR AND COMPRESSOR AND REFRIGERATION CYCLE USING THE SAME

(75) Inventors: Satoshi Kikuchi, Tokai (JP); Hiroyuki Mikami, Hitachinaka (JP); Tomio Yoshikawa, Mishima (JP); Baiying Huang, Shizuoka (JP); Hideyuki Kumakura, Shizuoka (JP)

(73) Assignee: Hitachi Appliances, Inc., Tokyo (JP)

( * ) Notice: Subject to any disclaimer, the term of this patent is extended or adjusted under 35 U.S.C. 154(b) by 173 days.

(21) Appl. No.: 12/851,017

(22) Filed: Aug. 5, 2010

(65) Prior Publication Data

US 2011/0030419 A1    Feb. 10, 2011

(30) Foreign Application Priority Data

Aug. 7, 2009    (JP) .................. 2009-185045

(51) Int. Cl.
*H02K 21/46* (2006.01)
(52) U.S. Cl. ............... 310/156.78; 310/156.83; 310/211
(58) Field of Classification Search ........... 310/156.78–156.84, 211
See application file for complete search history.

(56) References Cited

U.S. PATENT DOCUMENTS

| | | | | |
|---|---|---|---|---|
| 2,927,229 A | * | 3/1960 | Merrill | 310/162 |
| 3,242,361 A | * | 3/1966 | Varner et al. | 310/166 |
| 5,581,140 A | * | 12/1996 | Futami et al. | 310/156.53 |
| 7,247,965 B2 | * | 7/2007 | Weihrauch | 310/156.78 |
| 7,768,172 B2 | * | 8/2010 | Takahata et al. | 310/156.57 |
| 7,851,963 B2 | * | 12/2010 | Weihrauch | 310/216.001 |
| 2006/0181173 A1 | | 8/2006 | Takahashi et al. | |
| 2006/0267441 A1 | | 11/2006 | Hang et al. | |
| 2007/0145851 A1 | | 6/2007 | Kikuchi et al. | |
| 2009/0160285 A1 | | 6/2009 | Kikuchi et al. | |
| 2010/0011806 A1 | * | 1/2010 | Nam et al. | 62/510 |

FOREIGN PATENT DOCUMENTS

| | | |
|---|---|---|
| CN | 2185004 | 12/1994 |
| CN | 101465586 | 6/2009 |
| CN | 101629570 | 1/2010 |
| JP | 4-210758 | 7/1992 |
| JP | 10-336927 | 12/1998 |
| JP | 2001-037126 | 2/2001 |
| JP | 2006-230087 | 8/2006 |

(Continued)

OTHER PUBLICATIONS

Office Action issued in Chinese Patent Application No. 201010247394.2 on Jun. 4, 2012.

*Primary Examiner* — Burton Mullins
(74) *Attorney, Agent, or Firm* — Antonelli, Terry, Stout & Kraus, LLP.

(57) ABSTRACT

There is provided a self-starting permanent magnet synchronous motor in which a center axis of magnetic poles of a rotor is assumed to be a d axis, an axis deviated from the magnetic pole center axis by an electric angle of 90 degrees is assumed to be a q axis, at least two or more starting bars which are arranged near the d axis are arranged on a bore side of the bars near the q axis and are arranged in parallel with the q axis, so that a stable starting torque can be generated irrespective of a generating position of a stator magnetic flux which changes due to applying timing of a power source and a phase of a voltage, and a vibration/noises at the time of a stationary operation can be reduced.

19 Claims, 12 Drawing Sheets

FOREIGN PATENT DOCUMENTS

| | | |
|---|---|---|
| JP | 2006-333627 | 12/2006 |
| JP | 2007-181305 | 7/2007 |
| JP | 2007-330060 | 12/2007 |
| JP | 2009-153307 | 7/2009 |

* cited by examiner

SELF-STARTING PERMANENT MAGNET SYNCHRONOUS MOTOR AND COMPRESSOR AND REFRIGERATION CYCLE USING THE SAME

BACKGROUND OF THE INVENTION

The invention relates to a self-starting permanent magnet synchronous motor, a compressor using the motor, and further, a refrigeration cycle using the motor.

Generally, according to an induction motor, since it has a rigid structure and a line-start can be performed by a commercially available power source, it has such an advantage that the induction motor can be constructed at low costs as a driving source of a machine of a constant speed driving which does not need speed control.

According to the self-starting permanent magnet synchronous motor, the line-start can be performed by the commercially available power source in a manner similar to the foregoing induction motor, a driving unit can be constructed without adding an inverter, and further, a secondary copper loss at the time of the stationary operation is very small. There is, consequently, such an advantage that it is possible to largely contribute to realization of a high efficiency of a driving system for the above induction motor.

As a disadvantage of the self-starting permanent magnet synchronous motor, a point that since permanent magnets are arranged on the inner rim side of a squirrel-cage winding, a magnetic flux axis of a rotor has already been fixed can be mentioned. That is, a starting torque which is caused in the rotor upon starting is a synthesized torque of both of an induction torque which is caused in the squirrel-cage winding and an attraction force of permanent magnet magnetic fluxes and a stator magnetic flux which is generated by applying a power source. According to the line-start by the commercially available power source, such a situation that a position of the rotor can be specified as in the case of driving the inverter cannot be realized (a voltage phase cannot be controlled). Therefore, in dependence on the phase of the voltage which is applied upon starting, there is a case where the magnet magnetic fluxes and the stator magnetic flux repel each other or a case where the magnets are attracted in the direction opposite to the normal rotating direction and a negative torque is generated. There is, consequently, such a problem that a large difference occurs in the torque at the time of starting due to the phase of the voltage which is applied, that is, the position where the stator magnetic flux is generated.

As a rotor of such a self-starting permanent magnet synchronous motor, for example, the rotors having various kinds of structures have already been known in JP-A-4-210758, JP-A-10-336927 and JP-A-2001-37126.

SUMMARY OF THE INVENTION

At the time of starting the self-starting permanent magnet synchronous motor, the difference occurs in the starting torque due to the phase of the applied voltage as mentioned above. Its reasons and problems will be described hereinbelow.

First, in the case where the stator magnetic flux which is generated by applying the power voltage were generated on a delay side of the normal rotating direction for the permanent magnet magnetic fluxes, such a magnet torque that the magnets are attracted in the direction opposite to the normal rotating direction occurs in the rotor. On the other hand, since the rotor is rotatably supported by the bearing, it moves in the negative rotating direction. In this case, since a stator rotating magnetic field is rotating in the normal rotating direction, when considering it as slip-torque characteristics of the induction motor, the start-up is started from a region where the slip is equal to 1 or more. Therefore, as an induction torque, the torque which is extremely larger than a desired value occurs.

In this case, there is such a problem that since an excessive stress is applied to the bearing of the motor, a life of the bearing is shortened. A large torsional stress is applied to an apparatus attached to an end of an output axis, so that the apparatus is broken or the like. In this manner, there is a fear that a large adverse influence is exerted.

In the case where the stator magnetic flux which is generated by applying the power voltage occurred on a leading side of the normal rotating direction for the permanent magnet magnetic fluxes, since a magnet torque in the normal rotating direction occurs in the rotor, an influence on the induction torque occurring in the squirrel-cage winding is relatively small. Therefore, a large problem for the start does not occur. By such reasons, the large difference occurs in the starting torque which can be caused due to the applying phase of the power source.

According to the foregoing related art, the starting torque is influenced by a generating position of the stator magnetic flux which changes due to the applying timing of the power source or the phase of the voltage, so that it is difficult to obtain the sufficiently stable starting torque.

The invention is made in consideration of the problems in the related arts mentioned above and it is an object of the invention to provide a self-starting permanent magnet synchronous motor in which a stable starting torque can be generated irrespective of a generating position of a stator magnetic flux which changes due to applying timing of a power source or a phase of a voltage and the starting torque can be arbitrarily adjusted, and to provide a compressor using such a motor and, further, a refrigeration cycle of an air conditioner or the like.

According to the invention, to accomplish the above object, first, there is provided a self-starting permanent magnet synchronous motor including a rotor and a stator, the rotor includes a rotor core; a plurality of slots formed near an outer rim portion of the rotor core at regular intervals; conductive bars embedded in the slots; a squirrel-cage winding having conductive end rings for short-circuiting the conductive bars at both edge surfaces in an axial direction of the rotor core; at least one or more magnet inserting holes arranged on an inner rim side of the slots; and at least one or more permanent magnets embedded in the magnet inserting holes, and the permanent magnets construct field magnetic poles, and the plurality of conductive bars are arranged in such a manner that in a direction of a center axis of the magnetic poles constructed by the permanent magnets and in a direction of an axis rotated from the center axis of the magnetic poles by 90 degrees, distances from a center axis of the rotor differ.

According to the invention, in the permanent magnet synchronous motor disclosed above, it is preferable that the conductive bars are arranged in such a manner that a distance between the center axis of the rotor in the direction of the center axis of the magnetic poles constructed by the permanent magnets and the conductive bar is smaller than a distance between the center axis of the rotor in the direction of the axis rotated from the center axis of the magnetic poles by 90 degrees and the conductive bar. Further, it is preferable that the conductive bars in the direction of the center axis of the magnetic poles constructed by the permanent magnets are arranged in parallel with the axis rotated from the center axis of the magnetic poles by 90 degrees. Further, it is preferable that a cross sectional diameter of the conductive bar in the direction of the axis rotated from the center axis of the magnetic poles by 90 degrees is larger than a cross sectional diameter of another conductive bar.

According to the invention, in the permanent magnet synchronous motor disclosed above, a plurality of slits extending toward an outer circumference of the rotor may be further formed in an outer circumference of the conductive bars arranged in the direction of the center axis of the magnetic poles. Further, the plurality of slits may be formed so as to be concentrated on one point in the direction of the center axis of the magnetic poles. In addition, the plurality of slits may be formed so as to be concentrated on one point which is deviated from the direction of the center axis of the magnetic poles. Or, the rotor may be constructed in such a manner that segments of a rotor core having the slits so that extension lines cross at one point deviated from the center axis of the magnetic poles by a counterclockwise angle and rotor core segments having the slits so that extension lines cross at one point deviated from the center axis of the magnetic poles by a clockwise angle are alternately laminated in the axial direction. Or, at least two or more of the rotor core segments may be provided in the axial direction.

Further, according to the invention, in the permanent magnet synchronous motor disclosed above, the conductive bars in the direction of the center axis of the magnetic poles constructed by the permanent magnets may be arranged along an arc of a radius smaller than a radius of an arc along which the conductive bars in the direction of the axis rotated from the center axis of the magnetic poles by 90 degrees are arranged. Or, flux barriers extending to the outer rim side of the rotor core may be provided in an edge portion in the circumferential direction of the permanent magnets closest to the axis rotated from the center axis of the magnetic poles by 90 degrees. Further, two or more of the magnet inserting holes are provided per magnetic pole and a vacancy may be provided between the magnet inserting holes. Or, a cross sectional area of each of the conductive bars in the direction of only the axis rotated from the center axis of the magnetic poles by 90 degrees is large. Or, the squirrel-cage winding may be made of aluminum die-cast or copper die-cast. Or, the squirrel-cage winding may be formed by joining the bars and the end rings by a friction stirring joining. Further, the permanent magnet may be a rare earth magnet formed so that its cross sectional shape in a thickness direction is one of an almost square shape, an almost trapezoidal shape, and an almost arc shape. Or, the stator has a number of stator slots provided for the stator core and armature windings of a U phase, a V phase, and a W phase provided in the stator slots, and the number of turns of the armature windings enclosed in at least a pair of stator slots among the stator slots constructing each pole and each phase differs from that of another pair.

According to the invention, in order to accomplish the above objects, there is provided a compressor comprising: a compression mechanism portion for inhaling a refrigerant, compressing it, and discharging it; and a driving motor for driving the compression mechanism portion, wherein the driving motor is any one of the permanent magnet synchronous motors disclosed above.

In addition, according to the invention, in order to accomplish the above objects, there is provided a refrigeration cycle partially having a compressor which is driven by a motor, wherein the compressor is the compressor disclosed above.

According to the invention mentioned above, the self-starting permanent magnet synchronous motor having such excellent characteristics that the stable starting torque can be generated irrespective of a generating position of a stator magnetic flux which changes due to applying timing of a power source or a phase of a voltage and a vibration and noises at the time of the stationary operation can be reduced can be provided. Further, the compressor using such a motor can be provided. Moreover, the refrigeration cycle which is used in an air conditioner or a cooling/refrigerating apparatus can be provided. Consequently, an advantage which is practically and socially excellent can be derived.

The other objects and methods of achieving the objects will be readily understood in conjunction with the description of embodiments of the present invention and the drawings.

DESCRIPTION OF THE EMBODIMENTS

Embodiments of the invention will be described in detail hereinbelow with reference to the drawings.

Embodiment 1

Figure 1:
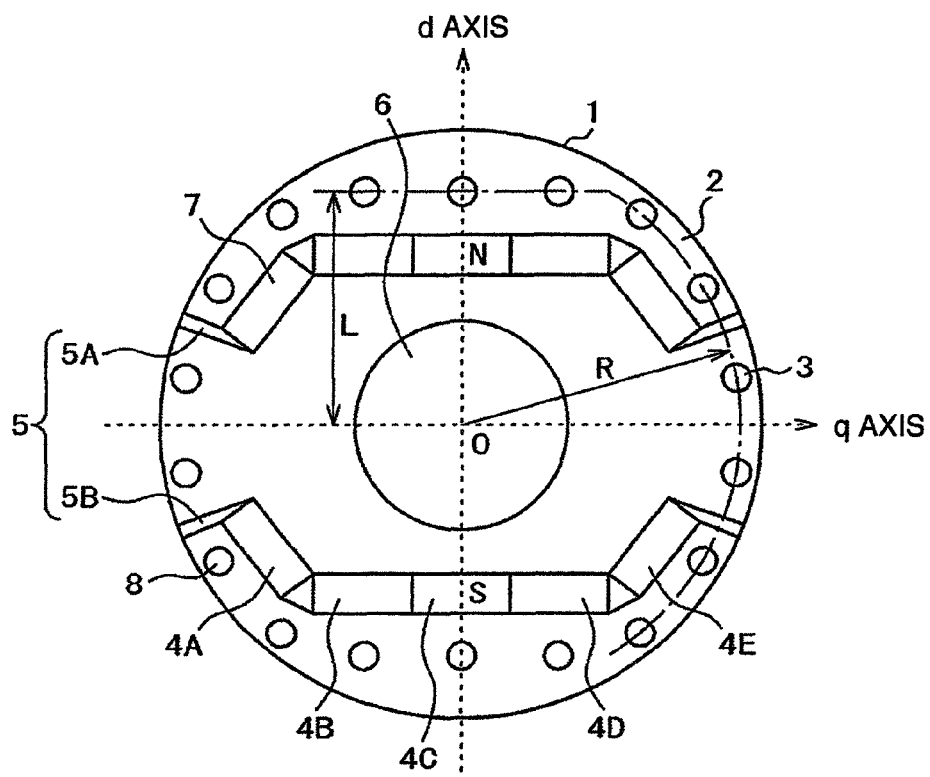
FIG. 1 is a cross sectional view in the radial direction of a rotor of a self-starting permanent magnet synchronous motor according to the first embodiment of the invention.
Figure 2:
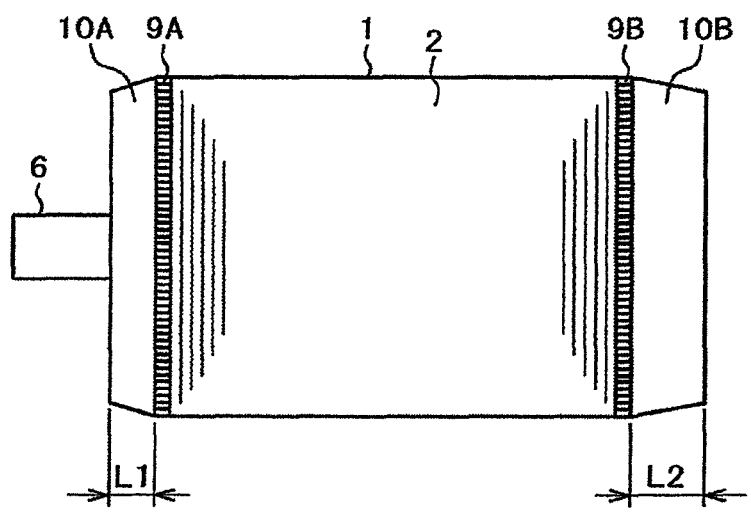
FIG. 2 is a constructional diagram in the axial direction of the rotor of the self-starting permanent magnet synchronous motor according to the first embodiment.
Figure 3A:
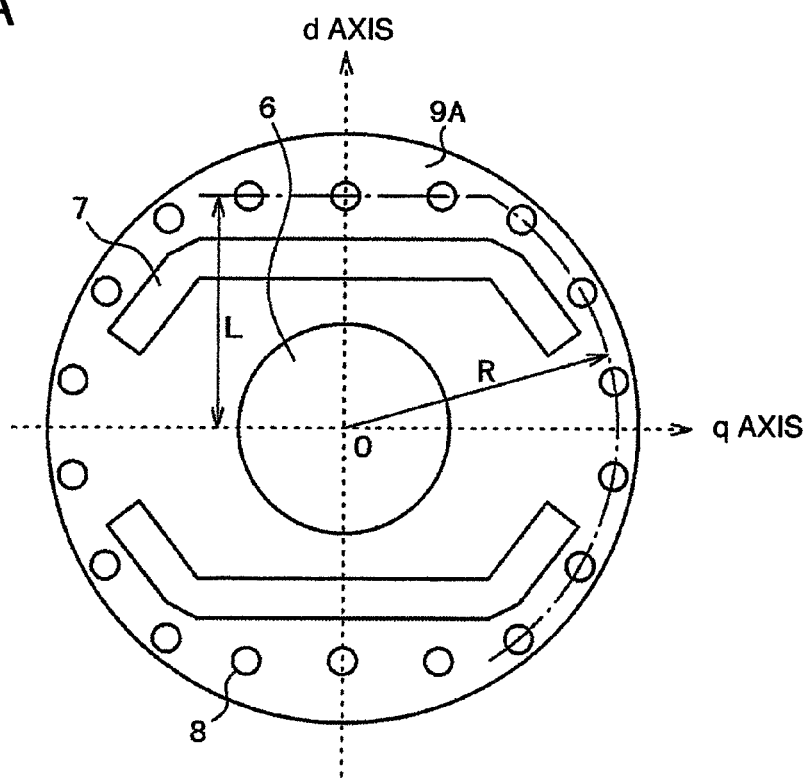
FIG. 3A is a diagram showing a shape of an end plate of the rotor according to the first embodiment.
Figure 3B:
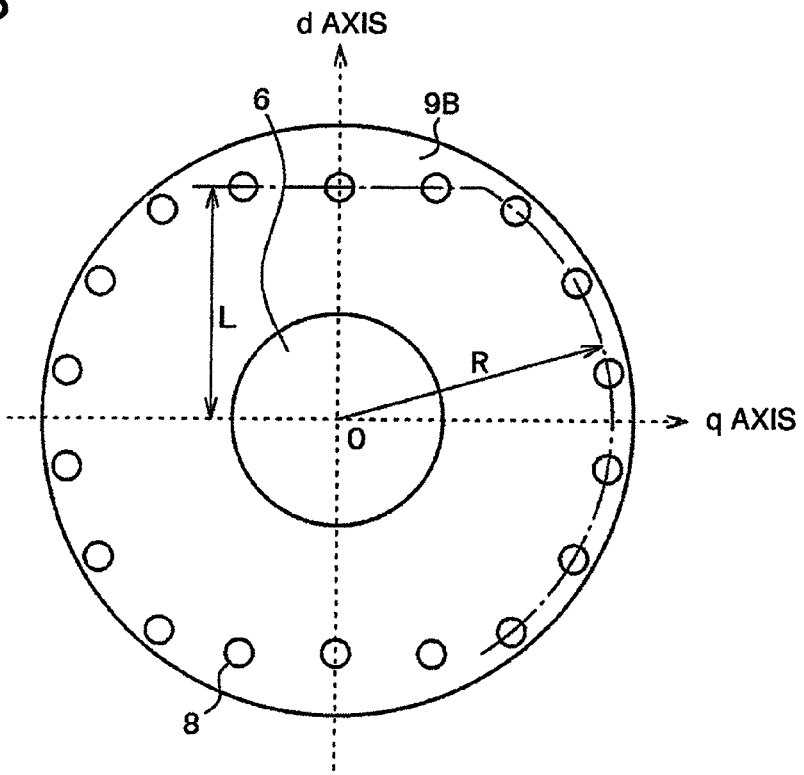
FIG. 3B is a diagram showing a shape of an end plate of the rotor according to the first embodiment.
Figure 4:
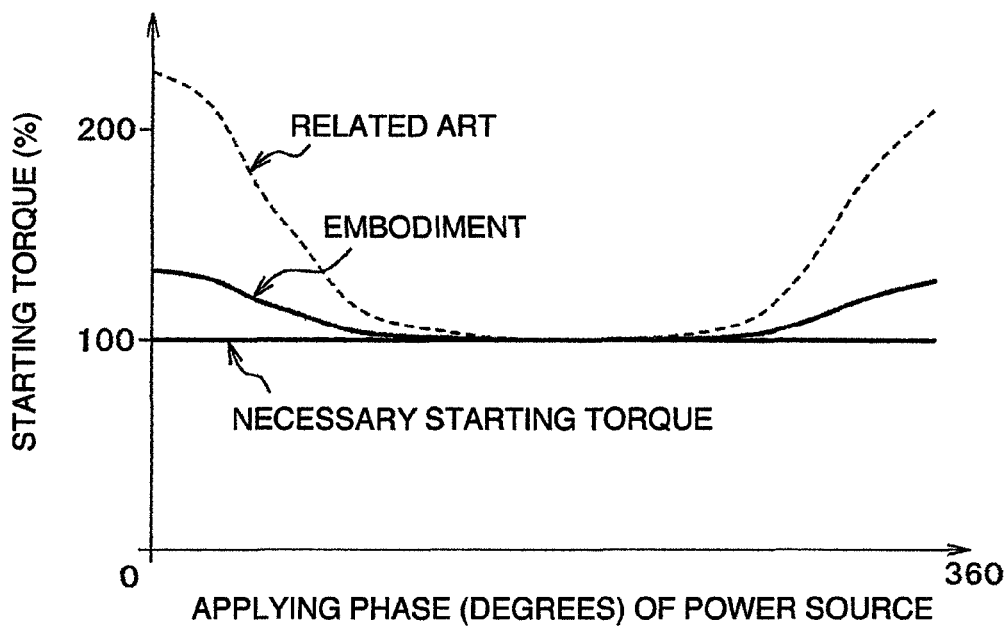
FIG. 4 is a diagram showing a measurement result of a starting torque to an applying phase of a power source in the self-starting permanent magnet synchronous motor according to the first embodiment.

FIG. 1 is a cross sectional view in the radial direction of a rotor (direction perpendicular to a rotation axis of the rotor) of a self-starting permanent magnet synchronous motor according to the first embodiment of the invention. FIG. 2 shows a side elevational view of the rotor of the self-starting permanent magnet synchronous motor according to the first embodiment of the invention. Each of FIGS. 3A and 3B shows a shape of, particularly, an end plate of the rotor according to the first embodiment of the invention. FIG. 4 shows a measurement result of a starting torque to an applying phase of a power source in the self-starting permanent magnet synchronous motor according to the embodiment.

First, in FIG. 1, a rotor 1 is constructed in such a manner that a number of rotor slots 8 are formed in a rotor core 2 provided on a shaft 6 and conductive bars 3 for starting are provided in the slots 8. Magnet inserting holes 7 are formed in the foregoing rotor core 2 and permanent magnets 4 are embedded in the holes 7 and they are arranged so that the number of magnetic poles is equal to 2 as will be obvious from the diagrams.

The permanent magnet 4 is a sintered magnet containing rare earth as a main component and its cross sectional shape in a thickness direction is a rectangular shape. The permanent magnet 4 is divided into a plurality of segments (in the example of the diagram, 5 segments 4A, 4B, 4C, 4D, and 4E) and each segment is embedded in the magnet inserting hole 7.

Since the permanent magnet 4 can be constructed so long as there are at least one or more segments, the number of segments is not limited to 5 segments as shown in the above example but may be equal to 5 or less or 5 or more. Further, the permanent magnet 4 whose cross sectional shape is an almost trapezoidal shape can be also constructed. Or, the permanent magnet may have an almost arc-shaped cross section. Although a ferrite system may be used as a main component of the magnet, particularly, rare earth is preferable or a sintered magnet or the other magnet such as bonded magnet can be also used.

As will be also obvious from the diagram, what are called flux barriers 5 (5A, 5B) are provided between the magnetic poles formed by the magnets mentioned above, thereby preventing a leakage flux that is caused between the magnetic poles.

In the diagram, when a center axis of the magnetic poles constructed by the permanent magnets 4 is assumed to be a d axis and an axis rotated from the d axis by an electric angle of 90 degrees is assumed to be a q axis, the bars 3 locating near the q axis are concentrically arranged at a distance of a radius R while a center O of the shaft 6 is set to an origin. A plurality of (in the example of the diagram, three) bars 3 locating near the d axis are arranged in parallel with the q axis at a position of a distance L from the origin O (where, R>L).

Subsequently, as shown in FIG. 2, rotor end plates 9 (9A, 9B) are arranged on both edge surfaces of the rotor core 2. That is, end rings 10 (10A, 10B) are formed by, for example, aluminum die-cast or copper die-cast through the end plates 9. The end rings 10 short-circuit the foregoing starting conductive bars 3 in the circumferential direction, thereby forming what is called a squirrel-cage winding.

In the diagram, as for the end rings 10, the end ring 10A on the output axis side and the end ring 10B on the non-output axis side have different shapes. More specifically speaking, a length L1 in the axial direction of the end ring 10A on the output axis side is set to be shorter than a length L2 in the axial direction of the end ring 1013 on the non-output axis side (L1<L2). A cross sectional area of the end ring on the output axis side is small and a cross sectional area of the end ring on the non-output axis side is large. By using the above structure, dimensions adapted to attach a cooling fan and a balance weight (both of them are not illustrated here) to the end ring on the non-output axis side can be assured.

As for the end plates 9 mentioned above, the end plate 9A is arranged on the output axis side and the end plate 9B is arranged on the non-output axis side.

Further, as shown in FIG. 3, although the end plates 9A and 9B have almost the same cross sectional shape as that of the foregoing rotor core 2, they differ from the rotor core with respect to a point that only the magnet inserting holes 7 and rotor slots 8 are provided for the end plate 9A on the output axis side without providing the flux barriers 5 and with respect to a point that only the rotor slots 8 are provided for the end plate 9B on the non-output axis side. The end plates constructed as mentioned above are arranged to both edge surfaces of the rotor core 2 by aligning their positional relation for the d axis and q axis mentioned above, respectively, and are die-casted through them, thereby preventing a conductive material from flowing into portions other than the slots 8 and forming the squirrel-cage winding. In this case, a bore dimension of the end ring 10A is set to be larger than that of the magnet inserting hole 7.

Advantages which are obtained by the self-starting permanent magnet synchronous motor (a structure of its stator will be described hereinafter with reference to FIG. 14) according to the first embodiment (embodiment 1) serving as a self-starting permanent magnet synchronous motor constructed by the rotor whose detailed construction has been described above will be described hereinbelow with reference to the measurement result shown in FIG. 4.

A relation of a starting torque to an applying phase of a power source was measured by the self-starting permanent magnet synchronous motor. Thus, as shown by a broken line of a graph in FIG. 4, it will be understood that a large difference of the generated starting torque occurs due to the applying phase according to the structure in the related art. In other words, it will be understood that at a position near the applying phase of 0 degrees, the generated starting torque is excessive, more specifically speaking, a torque which is about two or more times as large as the necessary starting torque is generated.

As reasons of it, there can be mentioned such a reason that the stator magnetic flux which is generated by applying the power voltage is generated for the magnetic fluxes by the permanent magnets on the delay side of the normal rotating direction, so that the magnet torque in which the magnets are attracted in the direction opposite to the normal rotating direction has been generated in the rotor. That is, since the rotor is rotatably supported by the bearing, it starts to move in the negative rotating direction. Therefore, as slip-torque characteristics of the induction motor, it is considered that the start-up can be started from a region where the slip is equal to 1 or more and an excessive induction torque is generated. In such a case, an excessive stress is applied to the bearing of the motor and a problem such as breakdown of the bearing, reduction in its life, or the like occurs.

Tests similar to those mentioned above were performed to the self-starting permanent magnet synchronous motor using the rotor having the construction mentioned with reference to FIGS. 1 to 3, so that characteristics shown by a solid line (in the embodiment) in FIG. 4 were obtained. That is, the difference of the starting torque to the applying phase can be remarkably reduced. As also mentioned above in FIG. 1, it has been found that such a phenomenon occurs by arranging the conductive bars 3 locating closest to the d axis onto the bore side.

The reason is that since the stator magnetic field which is generated upon starting crosses the conductive bars 3, an electromagnetic force which acts in the circumferential direction is generated in each of the conductive bars 3 by a Fleming's left-hand rule. The electromagnetic force becomes the induction torque by a product with the distance R from the center axis O of the rotor. That is, since the positions of the conductive bars 3 arranged on the bore side are smaller than the distance R from the center O, the induction torque at a position near the applying phase of 0 degrees can be reduced.

That is, by forming the rotor of the self-starting permanent magnet synchronous motor so as to have the rotor structure illustrated in FIG. 1 mentioned above in consideration of the above result, the difference of the starting torque to the applying phase of the power source can be reduced, so that the stable starting torque can be generated.

Embodiment 2

Figure 5:
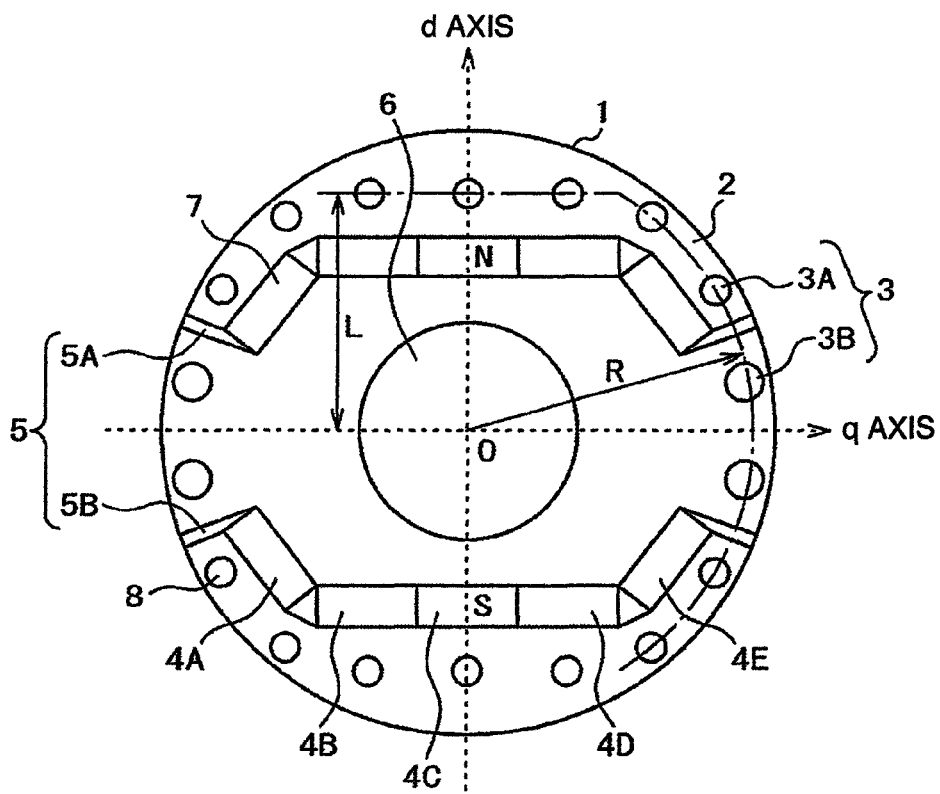
FIG. 5 is a cross sectional view in the radial direction of a rotor of a synchronous motor according to the second embodiment of the invention.
Figure 6:
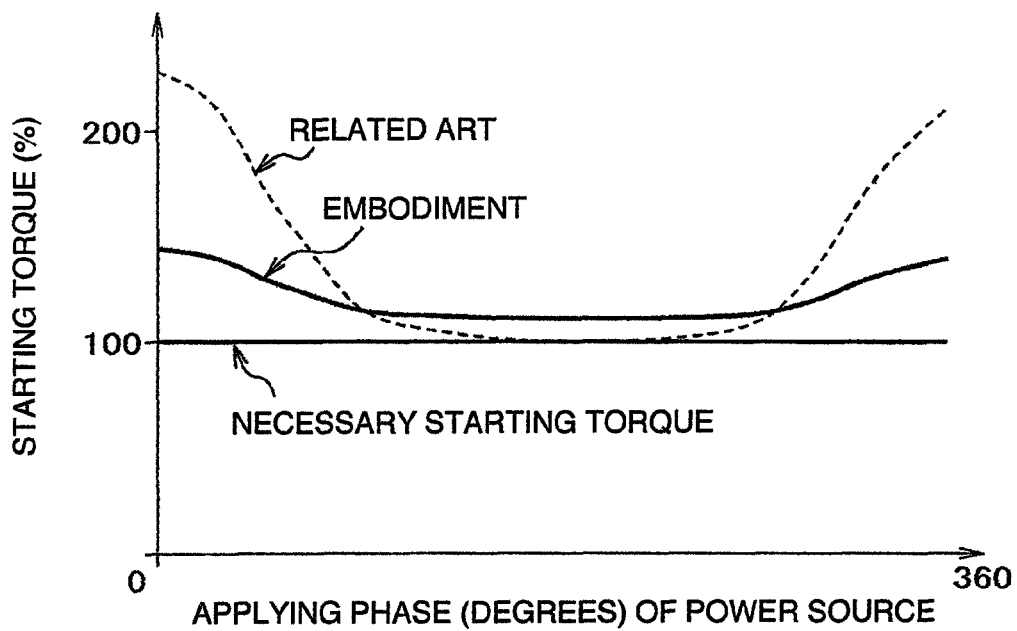
FIG. 6 is a diagram showing a measurement result of a starting torque to an applying phase of a power source in the second embodiment.

Subsequently, FIG. 5 shows a cross sectional view in the radial direction of a rotor of a synchronous motor according to the second embodiment (embodiment 2) of the invention. FIG. 6 shows a measurement result of a starting torque to an applying phase of a power source in the second embodiment. In FIG. 5, substantially the same component elements as those in FIG. 1 mentioned above are designated by the same reference numerals and their overlapped description is omitted.

A construction of the embodiment 2 differs from that of the embodiment 1 shown in FIG. 1 with respect to a point that a cross sectional area of each of only the conductive bars 3B (in the embodiment, 4 bars) closest to the q axis is set to be larger than that of each of other conductive bars 3A as will be obvious from the diagram.

According to such a construction, as shown by a solid line in a graph of FIG. 6, the torque can be increased on the average, so that a using range of the motor can be widened.

Embodiment 3

Figure 7:
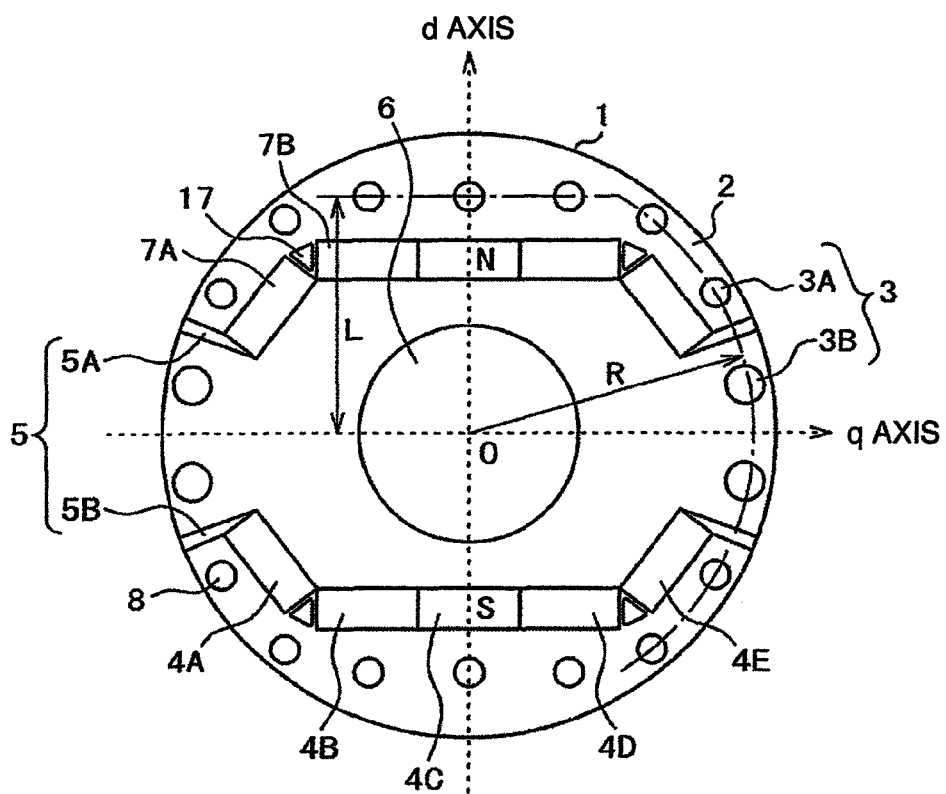
FIG. 7 is a cross sectional view in the radial direction of a rotor of a synchronous motor according to the third embodiment of the invention.

FIG. 7 further shows a cross sectional view in the radial direction of a rotor of a synchronous motor according to the third embodiment (embodiment 3) of the invention.

In FIG. 7, substantially the same component elements as those in FIG. 5 mentioned above are designated by the same reference numerals and their overlapped description is also omitted here.

A construction of the embodiment 3 differs from that of FIG. 5 with respect to a point that the magnet inserting hole 7 (refer to FIG. 5) is constructed by a portion 7A locating closest to the q axis and a portion 7B locating closest to the d axis and a vacancy 17 is provided between the magnet inserting holes 7A and 7B as will be obvious from the diagram.

According to such a construction, advantages similar to those in FIG. 5 mentioned above are obtained and a mechanical strength of the rotor core 2 can be enhanced, so that the motor of higher reliability can be provided.

Embodiment 4

Figure 8:
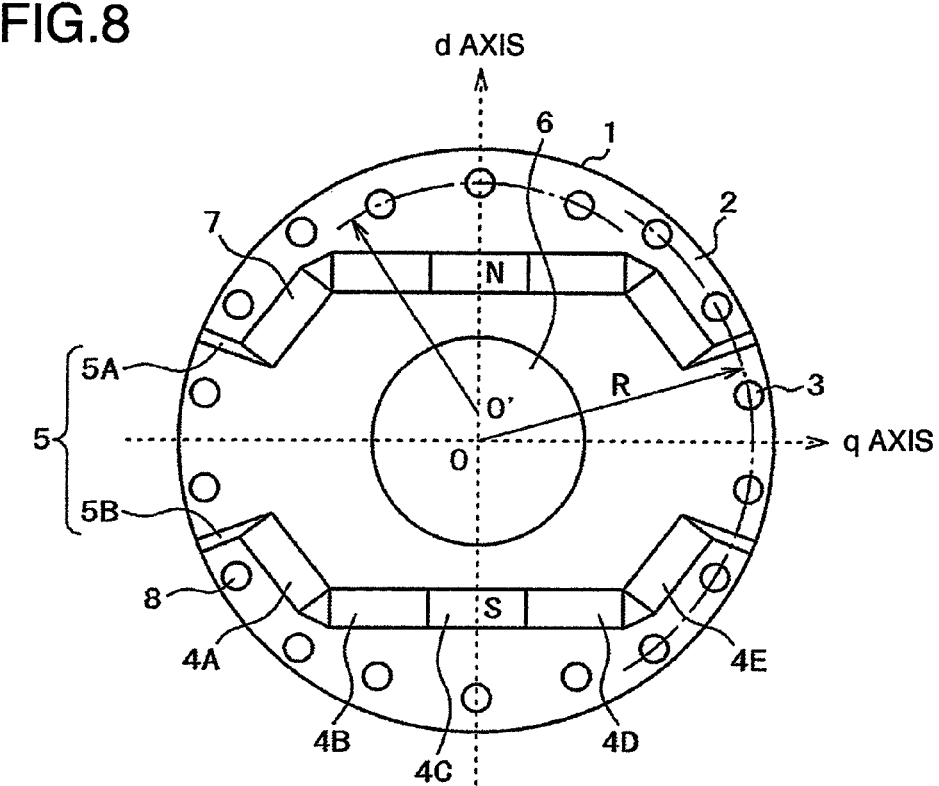
FIG. 8 is a cross sectional view in the radial direction of a rotor of a synchronous motor according to the fourth embodiment of the invention.

FIG. 8 further shows a cross sectional view in the radial direction of a rotor of a synchronous motor according to the fourth embodiment (embodiment 4) of the invention.

Also in FIG. 8, substantially the same component elements as those in FIG. 1 mentioned above are designated by the same reference numerals and their overlapped description is also omitted here.

A construction of the embodiment (embodiment 4) differs from that of FIG. 1 with respect to a point that the bars 3 locating closest to the d axis are arranged at positions of a radius R' around a point, as a center, moved from the center axis O of the shaft 6 onto the d axis by a distance O'.

According to such a construction, advantages similar to those in FIG. 1 mentioned above are also obtained.

Embodiment 5

Figure 9:
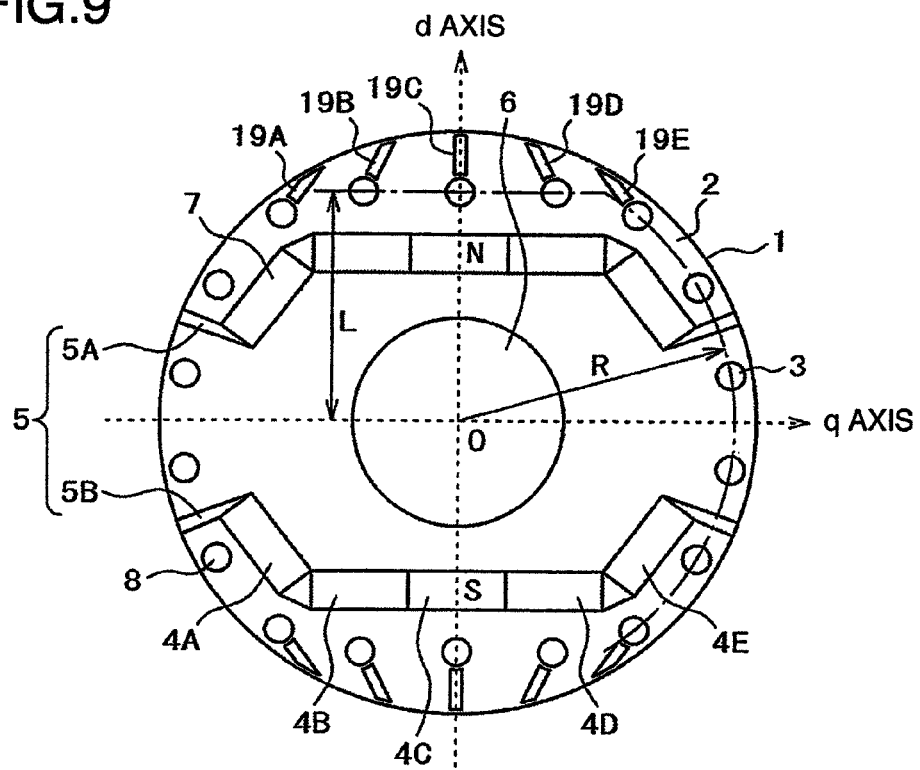
FIG. 9 is a cross sectional view in the radial direction of a rotor of a synchronous motor according to the fifth embodiment of the invention.

Further, FIG. 9 shows a cross sectional view in the radial direction of a rotor of a synchronous motor according to the fifth embodiment (embodiment 5) of the invention.

Also in FIG. 9, substantially the same component elements as those in FIG. 1 mentioned above are designated by the same reference numerals and their overlapped description is also omitted here.

A construction of the embodiment 5 differs from that of FIG. 1 with respect to a point that a plurality of slits 19 (in the embodiment, five slits 19A, 19B, 19C, 19D, and 19E) are formed in an outer rim portion of the conductive bars 3 locating near the d axis. Extension lines of those slits 19 are oriented so as to cross at a certain one point on the d axis.

According to such a construction, advantages similar to those in FIG. 1 mentioned above are obtained. Further, the magnetic fluxes of the permanent magnets 4 can be concentrated on one point (certain one point on the d axis mentioned above) and magnetic flux distribution of a gap (not shown here) can be made to approach an ideal sine wave. Thus, such excellent advantages that a vibration and noises during the operation of the synchronous motor can be reduced and various kinds of losses due to harmonics can be reduced are derived.

In addition, since the stator magnetic flux (not shown) upon starting can be made to effectively cross the conductive bars 3 near the d axis arranged on the bore side of the rotor core 2, the invention can also contribute to the improvement of the starting torque.

Embodiment 6

Figure 10A:
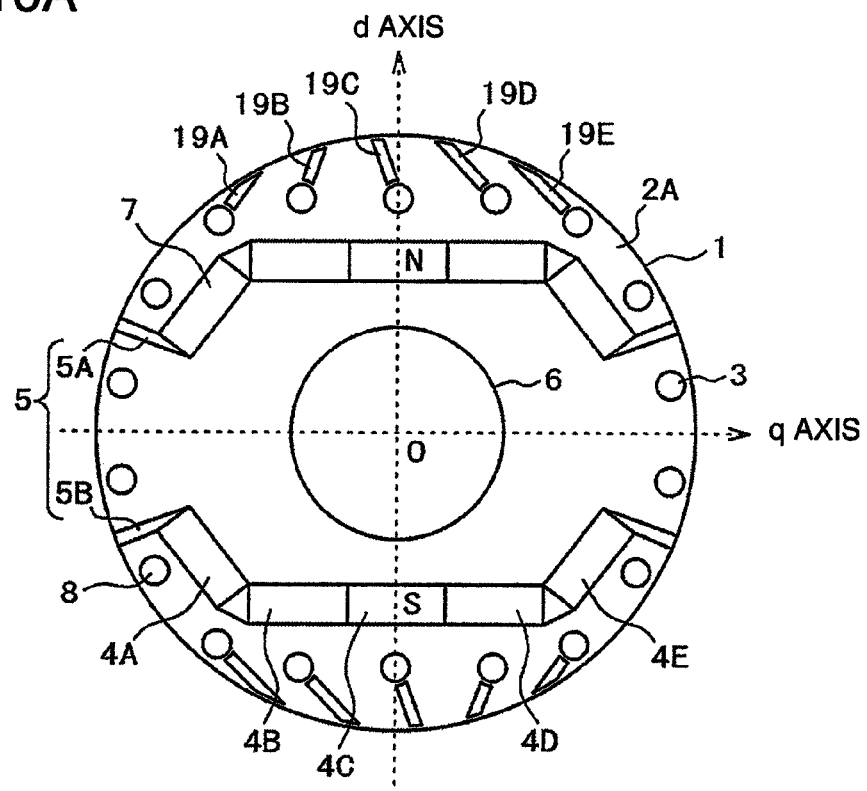
FIG. 10A is a cross sectional view in the radial direction of a rotor of a synchronous motor according to the sixth embodiment of the invention.
Figure 10B:
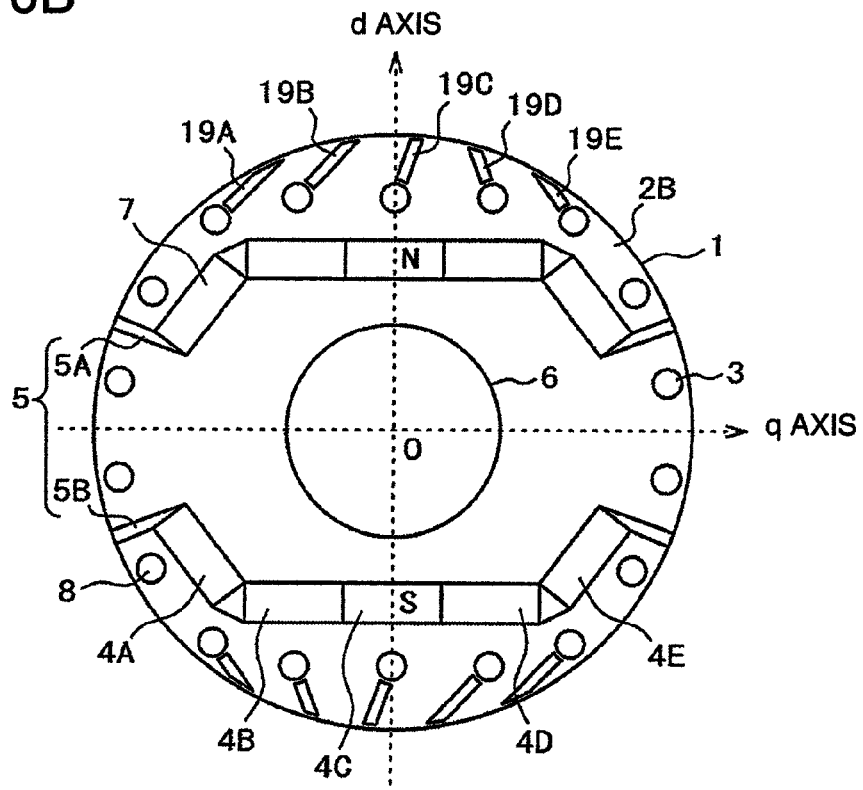
FIG. 10B is a cross sectional view in the radial direction of the rotor of the synchronous motor according to the sixth embodiment of the invention.
Figure 11:
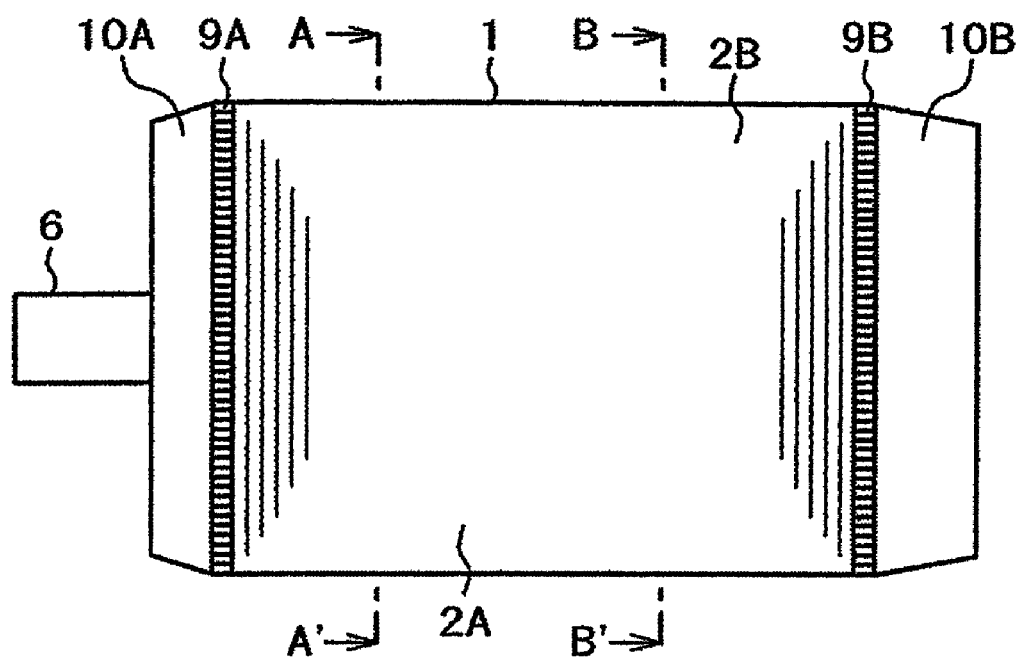
FIG. 11 is a constructional diagram in the axial direction of the rotor of the synchronous motor according to the sixth embodiment.

Each of FIGS. 10A and 10B shows a cross sectional view in the radial direction of a rotor of a synchronous motor according to the sixth embodiment (embodiment 6) of the invention. FIG. 11 shows a constructional diagram in the axial direction of the rotor of the synchronous motor according to the sixth embodiment.

Also in FIGS. 10A, 10B, and 11, substantially the same component elements as those in FIGS. 2 and 9 mentioned above are designated by the same reference numerals and their overlapped description is also omitted here.

A construction of the embodiment 6 differs from those of FIGS. 2 and 9 with respect to a point that the rotor core 2 constructing the rotor of the synchronous motor has two different cross sectional shapes depending on its position as illustrated in the two diagrams of FIGS. 10A and 10B. In more details, also as shown in FIG. 11, two segments in which cores have been laminated are arranged in the axial direction (right/left direction in the diagram) so as to sandwich their center portion. The cross sectional shape (that is, cross section taken along the line A-A' in the diagram) of the segment on the left side in the diagram is illustrated in FIG. 10A. The cross sectional shape (that is, cross section taken along the line B-B' in the diagram) of the segment on the right side in the diagram is illustrated in FIG. 10B.

First, as illustrated in FIG. 10A, a rotor core 2A is constructed in such a manner that extension lines of the slits 19 arranged in the outer rim portion of the conductive bars 3 near the d axis are oriented so as to cross at a point deviated from the d axis by a counterclockwise angle instead of a point on the d axis as mentioned in the foregoing embodiment 5. As illustrated in FIG. 10B, another rotor core 2B is constructed in such a manner that the extension lines are oriented so as to cross at a point deviated from the d axis by a clockwise angle. That is, the rotor cores 2A and 2B are formed in such a manner that inclination angles of the slits 19 formed on the outer circumference in the direction of the d axis of the rotor 1 vary (are reversed) at different positions in the axial direction.

According to such a construction, advantages which are almost equivalent to those in a construction in which the rotor 1 has been skewed can be obtained, so that such an advantage that a vibration and noises during the operation are reduced can be obtained.

Embodiment 7

Figure 12A:
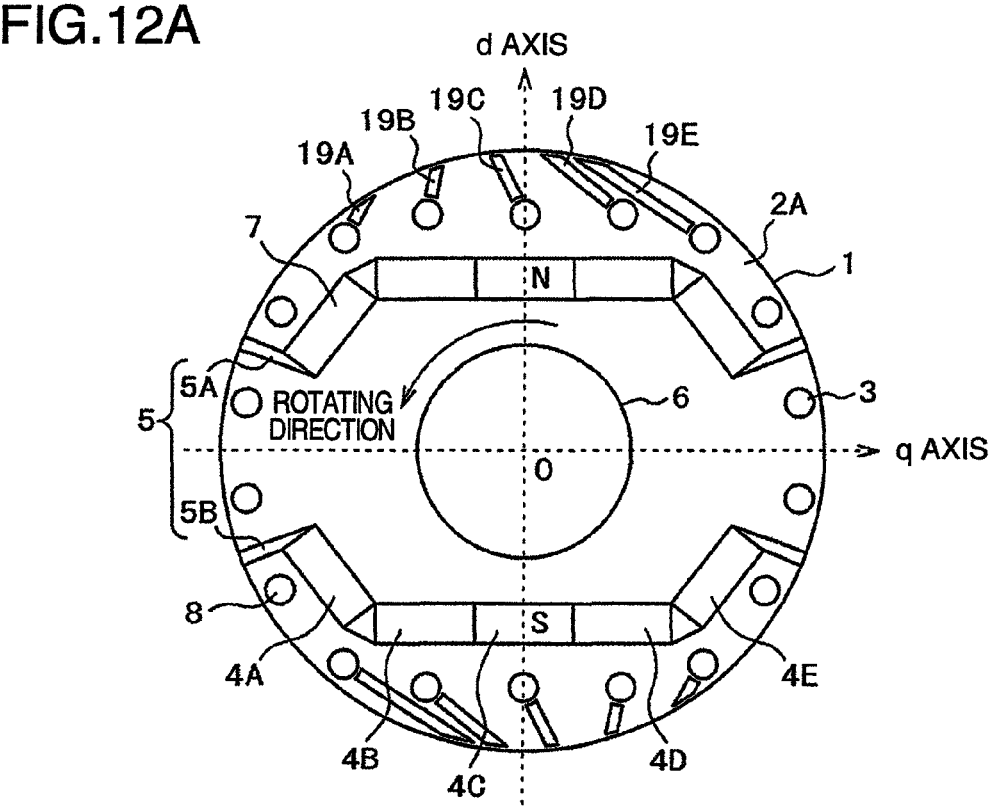
FIG. 12A is a cross sectional view in the radial direction of a rotor of a synchronous motor according to the seventh embodiment of the invention.
Figure 12B:
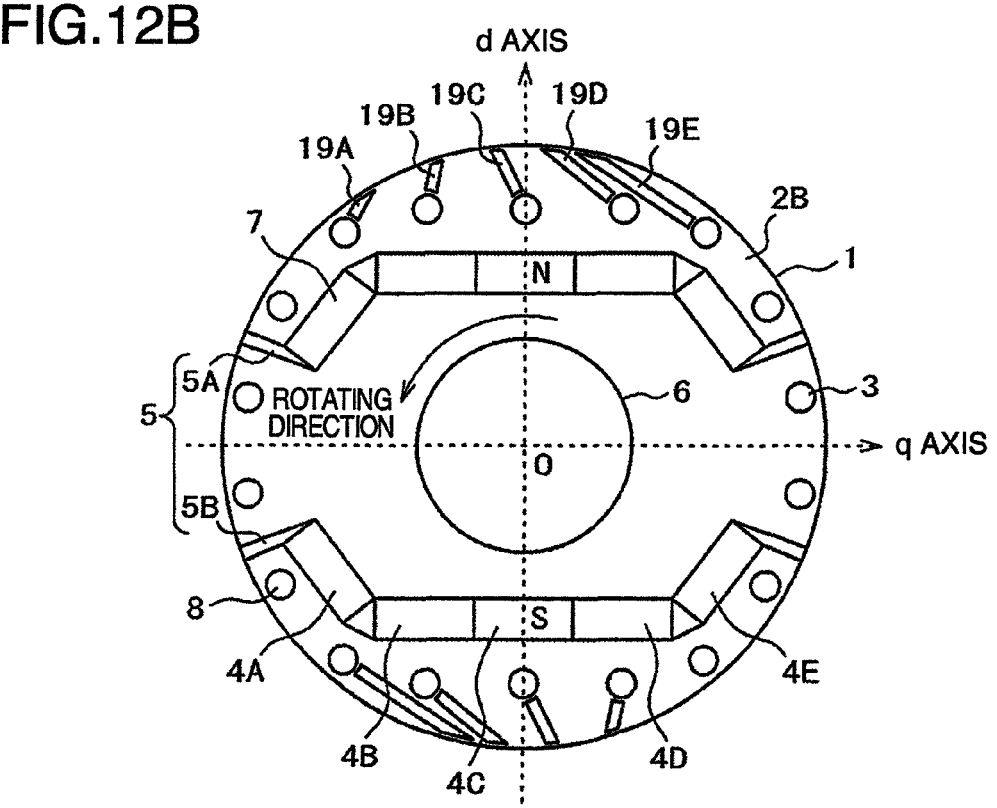
FIG. 12B is a cross sectional view in the radial direction of the rotor of the synchronous motor according to the seventh embodiment of the invention.

Further, each of FIGS. 12A and 12B shows a cross sectional view in the radial direction of a rotor of a synchronous motor according to the seventh embodiment (embodiment 7) of the invention.

Also in the diagrams, substantially the same component elements as those in FIGS. 10A and 10B mentioned above are designated by the same reference numerals and their overlapped description is also omitted here.

A construction of the embodiment 7 differs from those of FIGS. 10A and 10B with respect to a point that the slits 19 (19A, 19B, 19C, 19D, 19E) are oriented in such a direction as to cross at a point deviated from the d axis by the counterclockwise angle with respect to both of the rotor cores 2A and 2B on the basis of conditions of rotating directions specified by arrows in the diagrams. However, the slits are formed in such a manner that as for the orientation angles of the slits of the core 2A, an offset angle from the d axis is large and, on the other hand, the orientation angles of the slits of the core 2B are small.

According to such a construction, advantages similar to those in FIGS. 10A and 10B mentioned above are obtained. Further, since the orientation angles of one of the cores are concentrated on the rotating direction, the construction can contribute to the improvement of the overload torque at the time of the stationary operation.

Embodiment 8

Figure 13A:
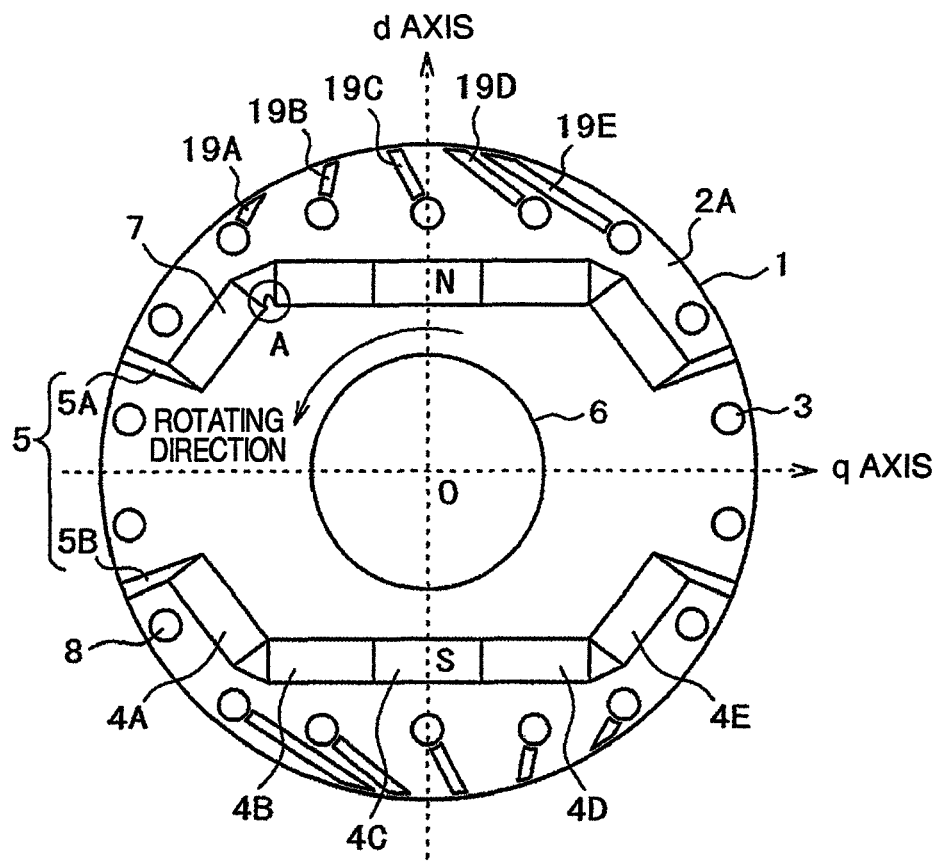
FIG. 13A is a constructional diagram in the axial direction of a rotor of a synchronous motor according to the eighth embodiment of the invention.
Figure 13B:
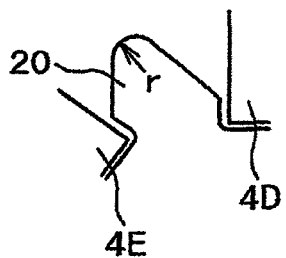
FIG. 13B is a partial enlarged diagram of FIG. 13A.

FIGS. 13A and 13B show cross sectional views in the axial direction of a rotor of a synchronous motor according to the eighth embodiment (embodiment 8) of the invention. Particularly, FIG. 13A shows a cross sectional shape in the radial direction. FIG. 13B is an enlarged diagram of an "A" portion in FIG. 13A. Also in those diagrams, substantially the same component elements as those in FIG. 9 mentioned above are designated by the same reference numerals and their overlapped description is also omitted here.

A construction of the embodiment 8 differs from that of FIG. 9 (embodiment 5) with respect to a point that the slits 19 are oriented in such a direction as to cross at a point deviated from the d axis by the counterclockwise angle on the basis of conditions of rotating directions specified as shown in the diagrams and with respect to a point that a projection 20 whose front edge portion is rounded by r is provided between the permanent magnets 4E and 4D locating on the leading side of the rotating direction. To arrange the projection 20, the permanent magnets 4B, 4C, and 4D are arranged so as to be deviated to the delay side of the rotating direction for the d axis.

According to such a construction, advantages similar to those in FIG. 9 (embodiment 5) mentioned above are obtained. In addition, since the orientation angles of the core are concentrated and the magnetic fluxes which are generated from the permanent magnets are located on the extension lines in the orienting direction of the magnetic fluxes due to the slits, the magnet magnetic fluxes can be more effectively used. Therefore, the construction can contribute to the improvement of the characteristics at the time of the stationary operation and the improvement of the overload torque.

Embodiment 9

Figure 14:
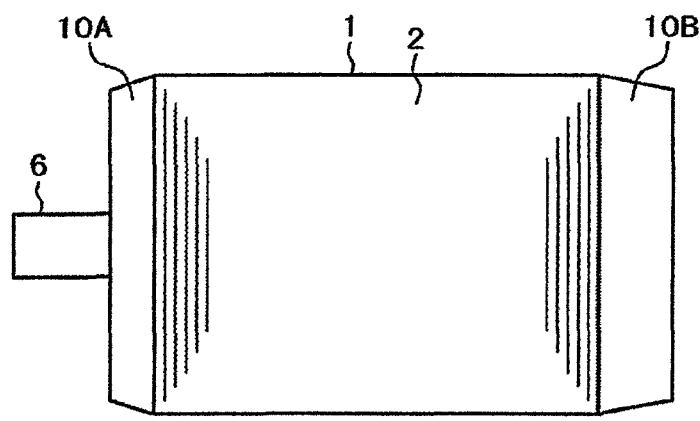
FIG. 14 is a constructional diagram in the axial direction of a rotor of a synchronous motor according to the ninth embodiment of the invention.

FIG. 14 shows a constructional diagram in the axial direction of a rotor of a synchronous motor according to the ninth embodiment (embodiment 9) of the invention.

Also in the diagram, substantially the same component elements as those shown in FIG. 2 mentioned above are designated by the same reference numerals and their overlapped description is also omitted here.

A construction of the embodiment 9 differs from that of FIG. 2 with respect to a point that, particularly, as a forming method of a squirrel-cage winding, conductive bars for starting (not shown) made of a conductive massive metal and the end rings 10 made of a conductive massive metal are joined by what is called a friction stirring joining and the squirrel-cage winding is constructed and no die-cast is used.

If all of the foregoing rotors are joined by, that is, the friction stirring joining and the squirrel-cage winding is constructed in this manner, its end plates can be excluded and a nest which is caused upon die-casting or a deformation of the rotor core 2 do not occur. Therefore, an electric function of the squirrel-cage winding can be stabilized and the construction can contribute to the improvement of reliability.

<Structure of Stator>

Figure 15:
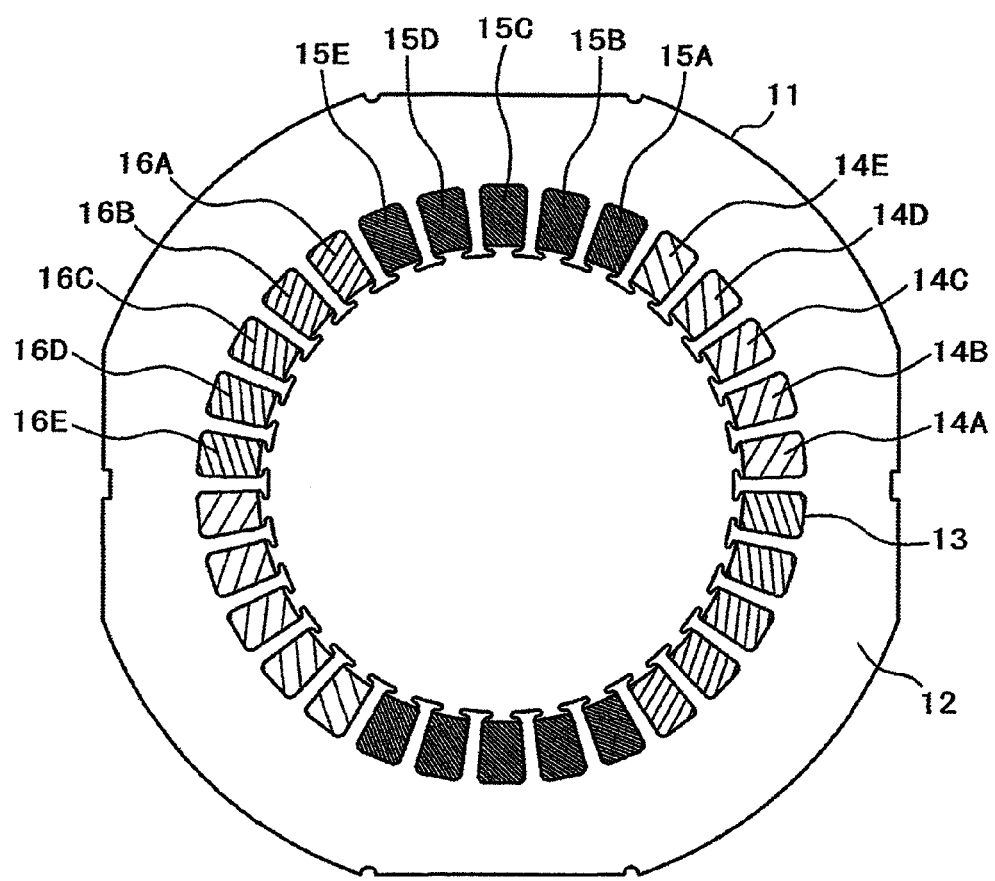
FIG. 15 is a cross sectional view showing a shape in the radial direction of the stator in the self-starting permanent magnet synchronous motor of the invention mentioned above.

Subsequently, FIG. 15 shows a cross sectional shape in the radial direction of the stator constructing the synchronous motor of the invention together with the foregoing rotor.

In FIG. 15, a stator 11 is formed by embedding U-phase coils 14 (14A to 14E), V-phase coils 16 (16A to 16E), and W-phase coils 15 (15A to 15E) into a number of stator slots 13 (in the embodiment, 30 slots) provided for the stator core 12. A relation among the numbers of turns of coils which are wound in the respective phases is set in such a manner that the numbers of turns of coils of the phases A, B, D, and E are equal and the number of turns of coil of the remaining phase C is smaller than those of other phases (C<A=B=D=E). Or, the stator may be constructed so as to satisfy a relation of (A=E>B=D=C) in place of the above relation.

According to the stator constructed as mentioned above, since the harmonics of a magnetomotive force which is caused due to the layout of the windings can be reduced and the number of turns per phase can be accurately adjusted, by combining the stator with any one of the rotors in the foregoing embodiments 1 to 8, a harmonics asynchronous torque which is generated upon starting can be reduced and, at the same time, a ratio between the number of conductive bars of the rotor and the number of turns of the stator can be accurately adjusted. Thus, an adjustment range of the starting torque can be further widened.

<Compressor>

Figure 16:
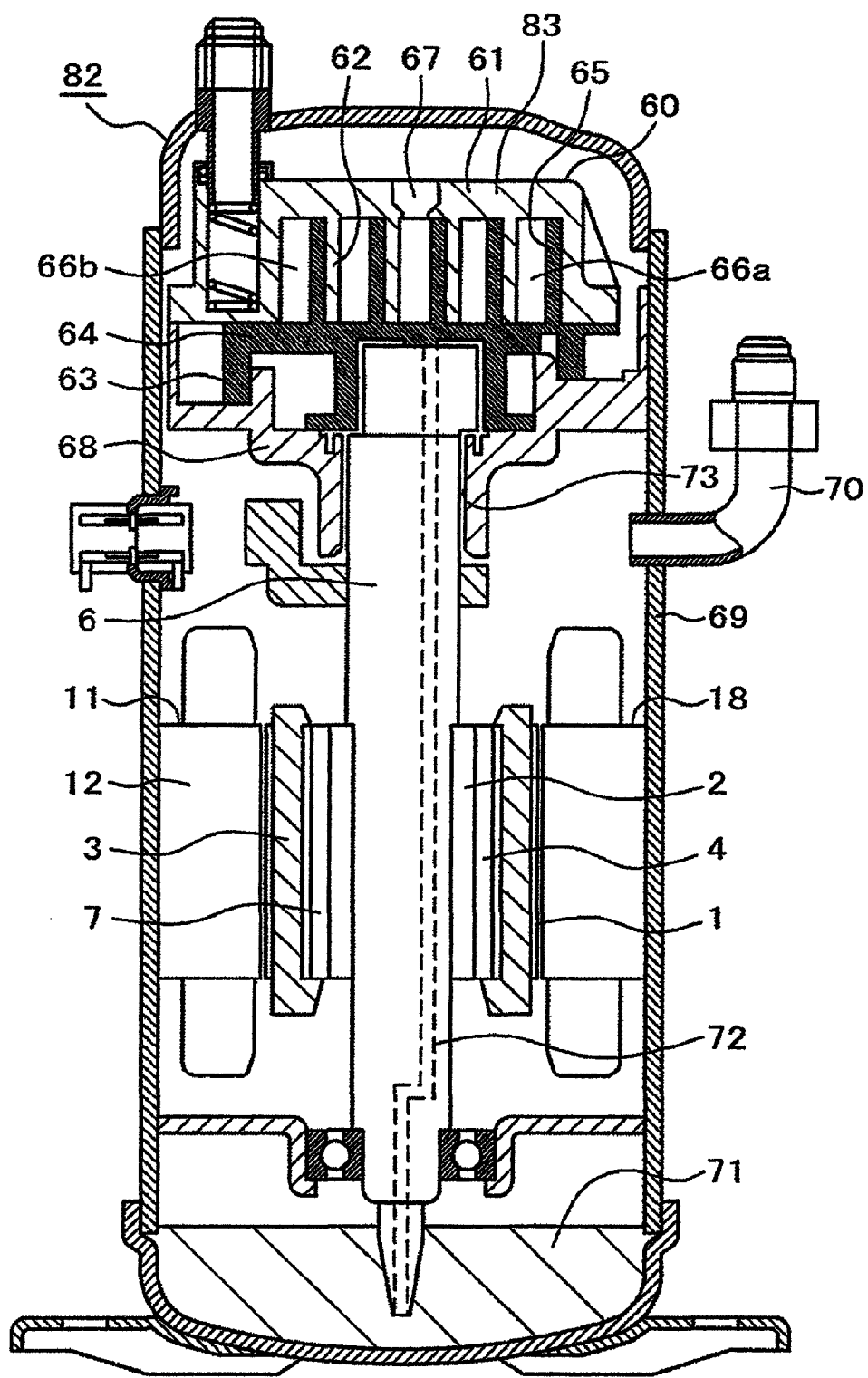
FIG. 16 is a cross sectional view showing an internal structure of a compressor having therein the self-starting permanent magnet synchronous motor of the invention mentioned above.

Further, FIG. 16 shows a cross sectional structure of a compressor in which the synchronous motor constructed by combining the foregoing stator with any one of the rotors in the foregoing embodiments 1 to 8 is used as a driving source.

The structure of a compressor 82 will be described hereinbelow with reference to FIG. 16. First, a compression mechanism portion 83 is formed by allowing a spiral lap 62 standing upright on an end plate 61 of a fixed scroll member 60 and a spiral lap 65 standing upright on an end plate 64 of a rotary scroll member 63 to be come into engagement with each other. By turning the rotary scroll member 63 by the crank shaft 6, the compressing operation is executed.

That is, among compression rooms 66 (66a, 66b, . . . ) which are formed by the foregoing fixed scroll member 60 and rotary scroll member 63, the compression room 66 locating on the outermost diameter side moves toward the centers of both of the scroll members 60 and 63 in association with the turning motion and its volume decreases gradually. After that, when both of the compression rooms 66a and 66b reach positions near the centers of both of the scroll members 60 and 63, compression gases in both of the compression rooms 66 are discharged from a discharge port 67 communicated with the compression rooms 66. The discharged compression gases pass through gas passages (not shown here) provided for the fixed scroll member 60 and a frame 68, reach an inside of a pressure vessel 69 under the frame 68, and are discharged to the outside of the compressor from a discharge pipe 70 attached to a side wall of the pressure vessel 69.

A self-starting permanent magnet synchronous motor 18 constructed by the stator 11 whose detailed structure has been described above and the rotor 1 is enclosed and sealed in the pressure vessel 69. By rotating the motor 18 at a constant speed, the foregoing compressing operation is executed. As illustrated in the diagram also, an oil retaining portion 71 is provided in a lower portion of the motor 18. An oil in the oil retaining portion 71 passes through an oil hole 72 formed in the crank shaft 6 by a pressure difference which is caused by the rotating motion, is transported to a sliding portion between the rotary scroll member 63 and the crank shaft 6, a sliding bearing 73, and the like, and is used for lubrication.

If the self-starting permanent magnet synchronous motor 18 described in detail above is applied as a motor for driving the compressor, a high efficiency of a constant speed compressor can be realized and the excessive starting torque which is generated due to the applying phase of the power source can be reduced. Therefore, the stress breakdown of the bearing 73 and scroll member 63 of the compressor can be prevented and the construction can contribute to the improvement of the reliability of the compressor. Particularly, by using the motor having the rotor illustrated in each of FIG. 5 (embodiment 2), FIG. 7 (embodiment 3), and FIG. 9 (embodiment 5), the invention can also easily cope with a case where a torque is instantaneously necessary.

<Refrigeration Cycle>

Figure 17:
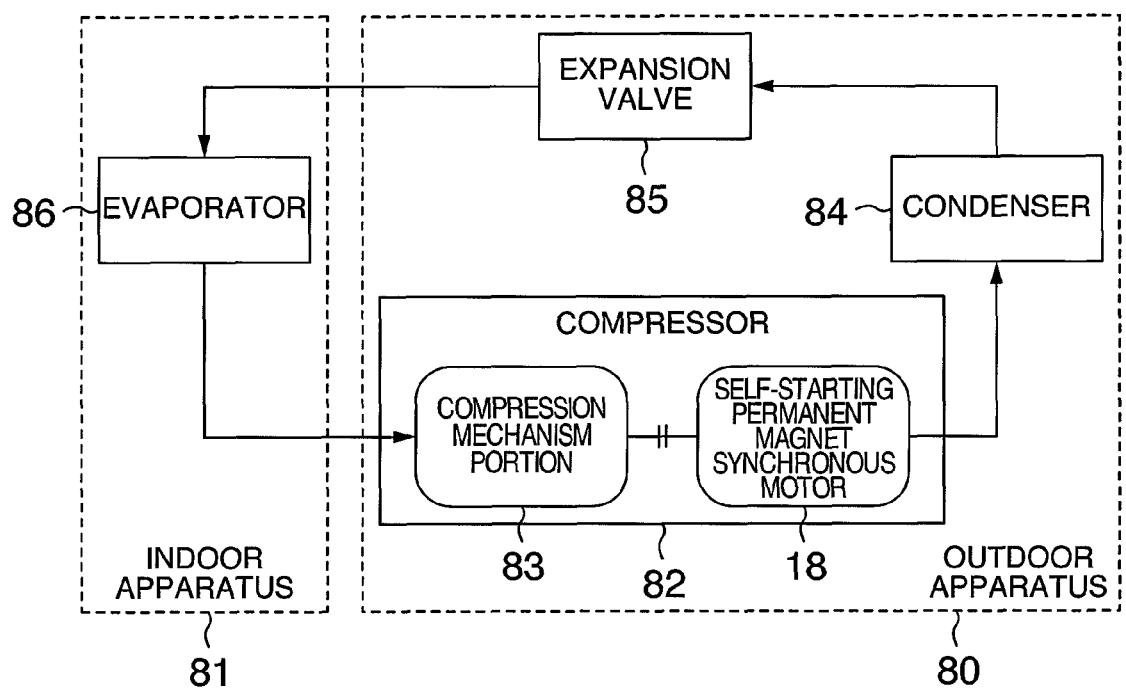
FIG. 17 is a diagram showing an example of a refrigeration cycle of an air conditioner using the compressor having therein the self-starting permanent magnet synchronous motor of the invention mentioned above.

FIG. 17 shows an example in which the invention is applied to a refrigeration cycle using the compressor 82 whose structure has been described above, for example, a refrigeration cycle of an air conditioner.

In the diagram, an outdoor apparatus 80, an indoor apparatus 81, and the compressor 82 are shown. The foregoing self-starting permanent magnet synchronous motor 18 and compression mechanism portion 83 are enclosed and sealed in the compressor 82. A condenser 84, an expansion valve 85, and an evaporator 86 are shown in the diagram.

In the refrigeration cycle having the construction as mentioned above, the refrigerant is circulated in the direction shown by arrows in the diagram, the compressor 82 compresses the refrigerant and performs a heat exchange between the outdoor apparatus 80 comprising the condenser 84 and the expansion valve 85 and the indoor apparatus 81 comprising the evaporator 86, thereby effecting a cooling function.

If the self-starting permanent magnet synchronous motor 18 according to the invention described in detail above is used for the refrigeration cycle of the air conditioner mentioned above or for the refrigeration cycle of a cooling apparatus, a refrigerating apparatus, or the like, as will be also obvious from the above description, since the efficiency of the self-starting permanent magnet synchronous motor 18 is improved, an electric power which is inputted to the whole refrigeration cycle can be reduced. There is, consequently, such an advantage that a discharge amount of carbon dioxide ($CO_2$) which causes a warming of the earth can be reduced. The invention can also contribute to the improvement of the reliability.

According to the invention described above, the self-starting permanent magnet synchronous motor in which the stable starting torque can be generated irrespective of the generating position of the stator magnetic flux which changes due to the applying timing of the power source or the phase of the voltage and the vibration and noises at the time of the stationary operation are small can be provided. Further, the compressor having the high reliability using such a permanent magnet synchronous motor can be provided. Furthermore, the refrigeration cycle for the air conditioner or the cooling apparatus/refrigerating apparatus which can reduce the discharge amount of carbon dioxide by decreasing the input electric power can be provided.

It should be further understood by those skilled in the art that although the foregoing description has been made on embodiments of the invention, the invention is not limited thereto and various changes and modification may be made without departing from the spirit of the invention and the scope of the appended claims.

The invention claimed is:

1. A self-starting permanent magnet synchronous motor, comprising:
   a rotor; and a stator,
   wherein the rotor comprises:
   a rotor core;
   a plurality of slots formed near an outer rim portion of the rotor core at regular intervals;
   a plurality of conductive bars embedded in the slots;
   a squirrel-cage winding having conductive end rings for short-circuiting the conductive bars at both edge surfaces in an axial direction of the rotor core;
   at least one or more magnet inserting holes arranged on an inner rim side of the slots; and
   at least one or more permanent magnets embedded in the magnet inserting holes, and wherein one side of the permanent magnets is arranged to be a North pole and another side of the permanent magnets is arranged to be a South pole to construct field magnetic poles of the North pole and the South pole;

wherein a center axis of the magnetic poles constructed by the permanent magnets is a d-axis and an axis rotated from the d-axis by 90 degrees is a q-axis; and wherein at least one conductive bar is arranged near the d-axis, radially outside the North or South poles of the permanent magnets and at a distance L from the q-axis, and at least one conductive bar is arranged near the q-axis a distance R from the center axis of the rotor, wherein R>L.

2. The motor according to claim 1, wherein a plurality of conductive bars are arranged in parallel near the d-axis, radially outside the North or South poles of the permanent magnets.

3. The motor according to claim 2, wherein a cross sectional diameter of the conductive bar arranged near the q-axis is larger than a cross sectional diameter of another conductive bar.

4. The motor according to claim 2, further comprising a plurality of slits adjacent the conductive bars arranged near the d-axis, the slits extending toward an outer circumference of the rotor.

5. The motor according to claim 4, wherein the plurality of slits are formed so as to be aligned to one point in the direction of the center- or d-axis of the magnetic poles.

6. The motor according to claim 4, wherein the plurality of slits are formed so as to be aligned to one point which is offset from the direction of the center- or d-axis of the magnetic poles.

7. The motor according to claim 4, wherein the rotor is constructed in such a manner that segments of a rotor core having the slits so that extension lines cross at one point deviated from the center- or d-axis of the magnetic poles by a counterclockwise angle and rotor core segments having the slits so that extension lines cross at one point deviated from the center axis of the magnetic poles by a clockwise angle are alternately laminated in the axial direction.

8. The motor according to claim 7, wherein at least two or more the rotor core segments are provided in the axial direction.

9. The motor according to claim 7, wherein on an inner rim side of the slots, projections whose front edge portions are rounded are provided among the plurality of permanent magnets locating on a leading side of a rotating direction of the rotor.

10. The motor according to claim 1, wherein the conductive bars in the direction of the center- or d-axis of the magnetic poles constructed by the permanent magnets are arranged along an arc of a radius smaller than a radius of an arc along which the conductive bars in the direction of the axis rotated from the center axis of the magnetic poles by 90 degrees are arranged.

11. The motor according to claim 1, wherein flux barriers extending to an outer rim side of the rotor core are provided in an edge portion in a circumferential direction of the permanent magnets closest to the axis rotated from the center- or d-axis of the magnetic poles by 90 degrees.

12. The motor according to claim 1, wherein two or more of the magnet inserting holes are provided per magnetic pole and a vacancy is provided between the magnet inserting holes.

13. The motor according to claim 1, wherein a cross sectional area of each of the conductive bars in the direction of only the axis rotated from the center- or d-axis of the magnetic poles by 90 degrees is large.

14. The motor according to claim 1, wherein the squirrel-cage winding is made of aluminum die-cast or copper die-cast.

15. The motor according to claim 1, wherein the squirrel-cage winding is formed by joining the conductive bars and the end rings by a friction stirring joining.

16. The motor according to claim 1, wherein the permanent magnet is a rare earth magnet formed so that its cross sectional shape in a thickness direction is one of an almost square shape, an almost trapezoidal shape, and an almost arc shape.

17. The motor according to claim 1, wherein the stator has a number of stator slots provided for the stator core and armature windings of a U phase, a V phase, and a W phase provided in the stator slots, and the number of turns of the armature windings enclosed in at least a pair of stator slots among the stator slots constructing each pole and each phase differs from that of another pair.

18. A compressor comprising:
   a compression mechanism portion for inhaling a refrigerant, compressing it, and discharging it; and
   a driving motor for driving the compression mechanism portion,
   wherein the driving motor is the permanent magnet synchronous motor according to claim 1.

19. A refrigeration cycle device partially having:
   the compressor according to claim 18 which compresses a refrigerant; and
   a motor which drives the compressor.

* * * * *